(12) United States Patent
Hanson, II et al.

(10) Patent No.: US 7,865,828 B1
(45) Date of Patent: Jan. 4, 2011

(54) SYSTEM, METHOD AND COMPUTER PROGRAM PRODUCT FOR UPDATING HELP CONTENT VIA A NETWORK

(75) Inventors: Don Robert Hanson, II, Beaverton, OR (US); Joseph Scott Bailey, Portland, OR (US); Paul Thomas Giesing, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 441 days.

(21) Appl. No.: 11/112,030

(22) Filed: Apr. 22, 2005

(51) Int. Cl.
*G06F 3/00* (2006.01)
*G06F 15/16* (2006.01)
*G06F 15/173* (2006.01)

(52) U.S. Cl. .............. 715/705; 715/708; 715/714; 715/717; 715/738; 715/739; 709/229; 709/204; 709/226; 709/238

(58) Field of Classification Search .......... 715/708, 715/714, 727, 738, 968; 709/229, 238, 226, 709/204; 345/705, 712, 760, 473, 788
See application file for complete search history.

(56) References Cited

U.S. PATENT DOCUMENTS

| 5,563,805 | A * | 10/1996 | Arbuckle et al. ........... 709/204 |
| 5,861,884 | A * | 1/1999 | Fujioka .................... 715/705 |
| 6,236,989 | B1 * | 5/2001 | Mandyam et al. ............... 1/1 |
| 6,289,370 | B1 * | 9/2001 | Panarello et al. ........... 709/200 |
| 6,434,619 | B1 * | 8/2002 | Lim et al. ................. 709/229 |
| 6,456,303 | B1 * | 9/2002 | Walden et al. ............. 715/705 |
| 6,581,105 | B2 * | 6/2003 | Miloslavsky et al. ........ 709/238 |
| 7,016,944 | B1 * | 3/2006 | Meyer et al. .............. 709/218 |
| 7,017,125 | B1 * | 3/2006 | Matsumoto ................. 715/864 |
| 7,024,658 | B1 * | 4/2006 | Cohen et al. .............. 717/117 |
| 7,028,252 | B1 * | 4/2006 | Baru et al. ............... 715/273 |
| 7,107,234 | B2 * | 9/2006 | Deguchi .................... 705/26 |
| 7,120,632 | B2 * | 10/2006 | Helmbrecht et al. ............ 1/1 |
| 7,203,430 | B2 * | 4/2007 | Ohta ....................... 399/8 |
| 7,277,884 | B2 * | 10/2007 | Vadai et al. ................. 1/1 |
| 7,529,734 | B2 * | 5/2009 | Dirisala .................... 1/1 |
| 2002/0029268 | A1 * | 3/2002 | Baca et al. ............... 709/224 |
| 2002/0169866 | A1 * | 11/2002 | Lim et al. ................. 709/223 |
| 2002/0188665 | A1 * | 12/2002 | Lash ........................ 709/203 |
| 2003/0023534 | A1 * | 1/2003 | Kadambe .................... 705/36 |
| 2004/0090359 | A1 * | 5/2004 | McMakin et al. ............ 342/22 |
| 2004/0123153 | A1 * | 6/2004 | Wright et al. ............. 713/201 |
| 2004/0139156 | A1 | 7/2004 | Matthews et al. ........... 709/204 |
| 2005/0086534 | A1 * | 4/2005 | Hindawi et al. ............ 713/201 |
| 2005/0163050 | A1 * | 7/2005 | Hopkins ................... 370/231 |
| 2005/0182783 | A1 * | 8/2005 | Vadai et al. ............... 707/102 |
| 2005/0234984 | A1 * | 10/2005 | Rogerson et al. ......... 707/104.1 |
| 2005/0273857 | A1 * | 12/2005 | Freund .................... 726/23 |
| 2006/0080607 | A1 * | 4/2006 | Cohen et al. .............. 715/705 |
| 2006/0129931 | A1 * | 6/2006 | Simons et al. ............. 715/705 |

* cited by examiner

*Primary Examiner*—Steven P Sax
*Assistant Examiner*—Linh K Pham
(74) *Attorney, Agent, or Firm*—Zilka-Kotab, PC

(57) ABSTRACT

A system, method and computer program product are provided for updating help content. Initially, information relating to issues associated with software is gathered from a plurality of users. Such software includes a first set of help content. Next, an additional set of help content is gathered based on the information. Further, the additional set of help content is distributed to the users based on an update schedule, utilizing a network. Thus, the additional set of help content is capable of being integrated with the first set of help content and presented to the user via a single interface, utilizing the software.

35 Claims, 5 Drawing Sheets

SYSTEM, METHOD AND COMPUTER PROGRAM PRODUCT FOR UPDATING HELP CONTENT VIA A NETWORK

FIELD OF THE INVENTION

The present invention relates to help content for software, and more particularly to managing help content for software.

BACKGROUND

Typically, software applications offer a basic level of support through built-in help content that provides answers to simple usage problems. However, when software users encounter complex problems, they are referred to a customer solution center that has access to a knowledge base containing solutions for such problems. This is primarily due to the fact that software developers cannot predetermine such complex situations and therefore do not include them into the help content.

Almost all software available today is equipped with standard help content that is accessed when a user "clicks" on an associated 'Help' button. For example, there is a standard 'Help' button in almost every window frame generated by an MS Windows® application. Each 'Help' button provides assistance on the data and/or function contained in the associated window. In the current scheme, the software loads an associated help file whenever a user clicks on the 'Help' button. The user is then able to maneuver through this file to get the required help content.

Software is growing in complexity due to increased functional capabilities. The help content provided with such software is frequently insufficient to resolve complex issues created by the software. The help content that ships with the software represents issues that a software company is both aware of and believes to be of interest to customers. Once a product has been deployed in the field, however, issues and situations arise for which there is not help content available.

For example, these issues can arise from use of the software in unanticipated situations, unforeseen incompatibilities, and/or other problems. Also, some users undoubtedly try to utilize the software to accomplish tasks for which it was not intended. In cases where it is not possible to resolve a problem through the above mentioned help content, the user typically either calls a help desk agent and/or a customer service representative associated with the software manufacturer.

To date, there are channels for a software provider to collect information on issues, and mechanisms to update or add help content. However, one problem facing software companies relates to how to distribute the updated help content to the installed customer base. One traditional answer has been to update the help content at a subsequent release, while posting articles in a support-related knowledge base that is external to the user environment.

With this approach, updated or new help content is not available to the customer in their environment, when they need the same. Further, such help content may even contradict information that is available in the installed help content that already exists.

There is thus a need for overcoming these and/or other problems associated with the prior art.

SUMMARY

A system, method and computer program product are provided for updating help content. Initially, information relating to issues associated with software is gathered from a plurality of users. Such software includes a first set of help content. Next, an additional set of help content is gathered based on the information. Further, the additional set of help content is distributed to the users based on an update schedule, utilizing a network. Thus, the additional set of help content is capable of being integrated with the first set of help content and presented to the user via a single interface, utilizing the software.

In one embodiment, the software may be web-based. Further, a user interface of the software may be accessed via an Internet browser.

In another embodiment, the information may be gathered via the network (e.g. via e-mail, etc.). Further, the information may be gathered via a telephone-based help center. To this end, the information may be stored in a help database.

As an option, statistics may be determined based on the information stored in the help database. Thus, the additional set of help content may be generated based on the statistics.

As still another option, characteristics associated with computers of the users may be gathered. The characteristics may include characteristics of at least one of software and hardware of the computers. To this end, the additional set of help content may be at least one of generated and distributed based on the characteristics.

In another embodiment, the issues associated with the software may include unanticipated problems. Further, as an option, a source of the additional set of help content may be verified. Still yet, the additional set of help content may be distributed to the users prior to a subsequent version of the software releases.

Optionally, the additional set of help content may include additional help topics, additional help formats, a screen cam, etc. Further, the integration may include updating a table of contents of the help content. To avoid an abundance of bandwidth usage, the additional set of help content may be a fraction of a size of the first set of help content.

While the software may include any particular type of software, it may, in one embodiment, include security software.

Another system, method and computer program product are provided for updating help content, from the perspective of a computer with the help content installed thereon. Initially, a first set of help content associated with software is accessed. Next, an additional set of help content is received based on information relating to issues associated with the software. An update schedule associated with the software is identified. To this end, the additional set of help content is received based on the update schedule, utilizing a network. Thereafter, the additional set of help content is integrated with the first set of help content. The integrated first set of help content and additional set of help content are then presented to a user via a single interface.

DETAILED DESCRIPTION

Figure 1:
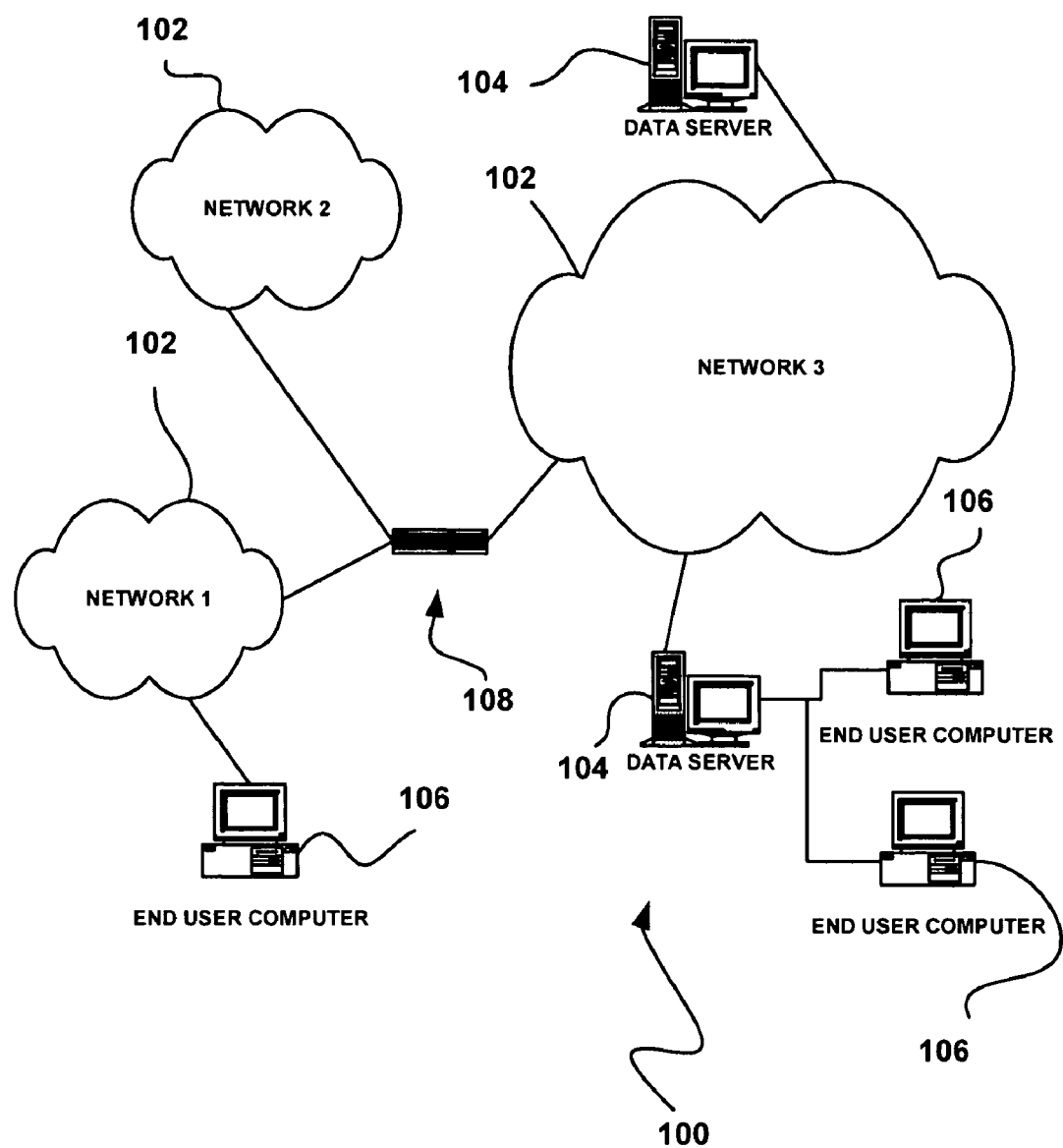
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are server computers 104 which are capable of communicating over the networks 102. Also coupled to the networks 102 and the server computers 104 is a plurality of end user computers 106. In order to facilitate communication among the networks 102, at least one gateway or router 108 is optionally coupled there between.

It should be noted that each of the foregoing network devices in the present network architecture 100, as well as any other unillustrated hardware and/or software, may be equipped with various security features. For example, the various server computers 104 and/or end user computers 106 may be equipped with any type of software installed thereon. Such software may further include help content for helping a user with any aspect associated with the software. More information regarding optional functionality and architectural features will now be set forth for illustrative purposes.

Figure 2:
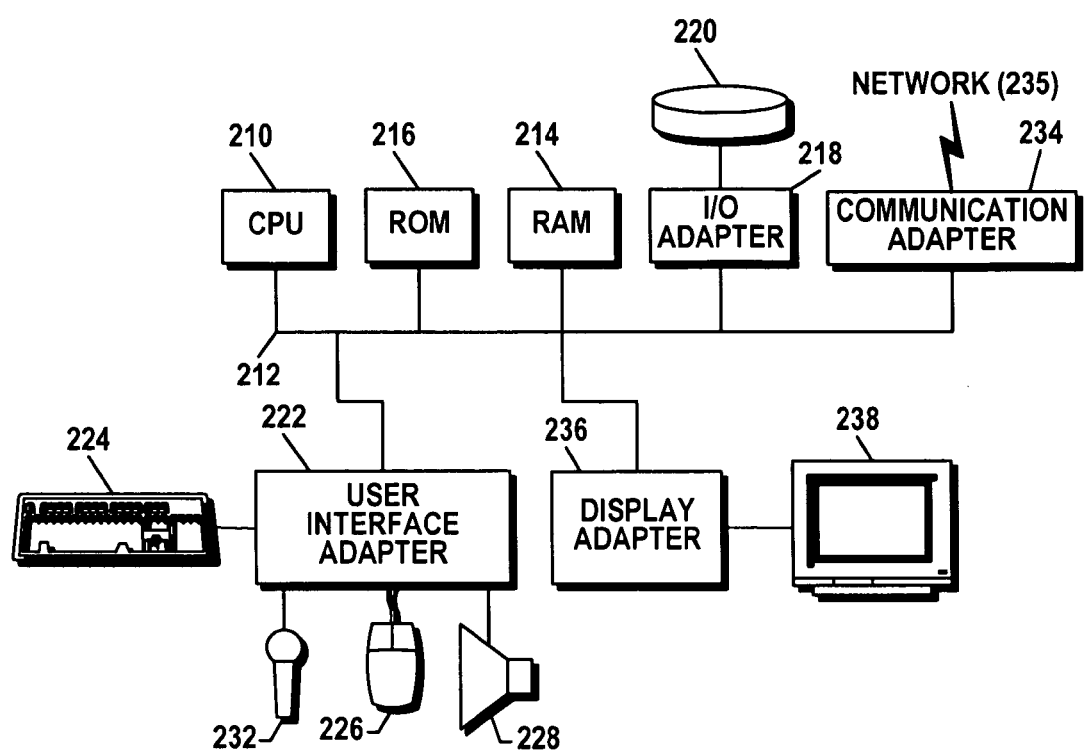
FIG. 2 shows a representative hardware environment that may be associated with the server computers and/or end user computers of FIG. 1, in accordance with one embodiment.

FIG. 2 shows a representative hardware environment that may be associated with the server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
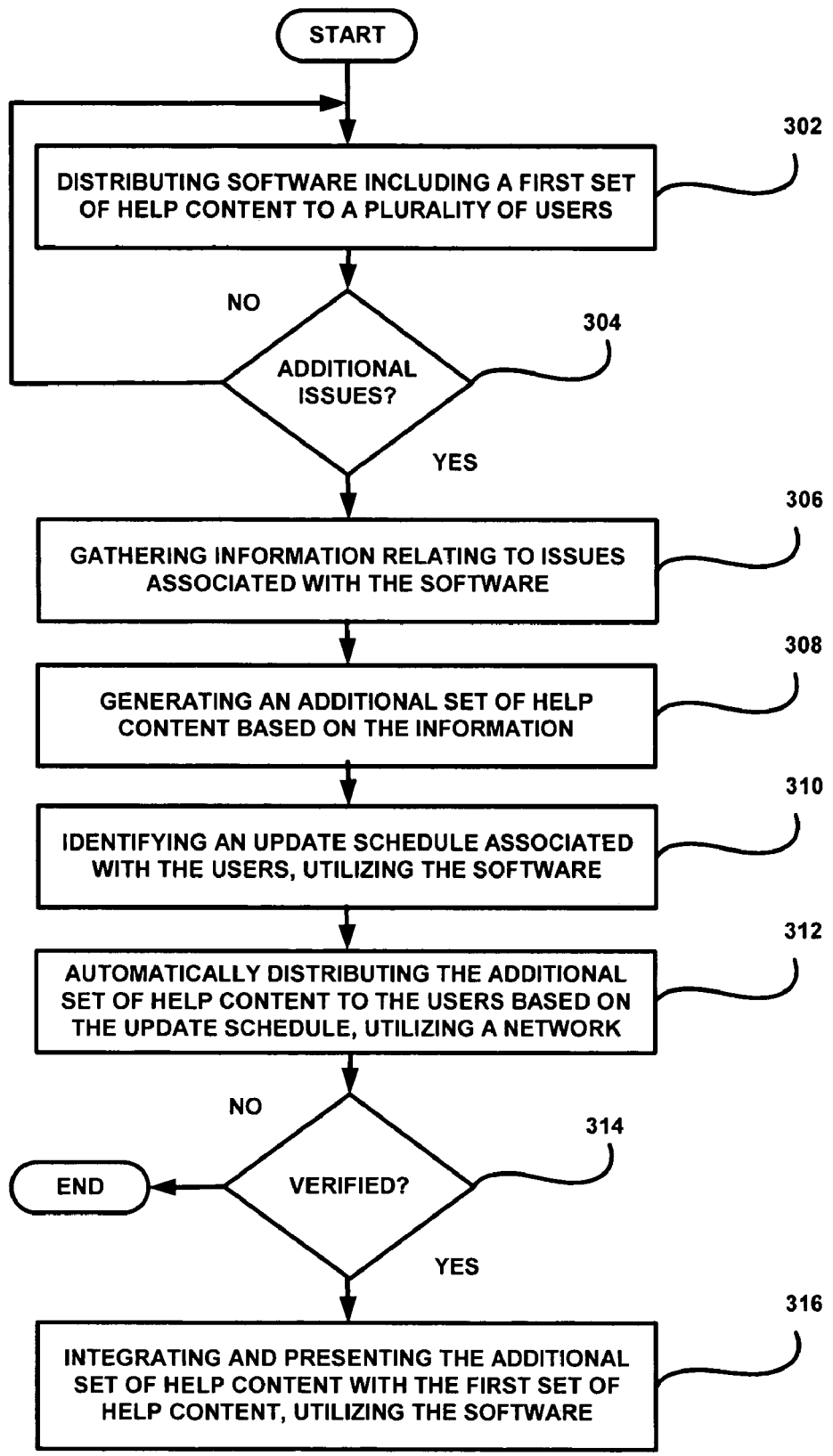
FIG. 3 illustrates a method for updating help content, in accordance with one embodiment.

FIG. 3 illustrates a method 300 for updating help content, in accordance with one embodiment. As an option, the present method 300 may be implemented in the context of the architecture and environment of FIGS. 1 and/or 2. Of course, however, the method 300 may be carried out in any desired environment.

In use, software including a first set of help content is distributed to a plurality of users. Note operation 302. This may be accomplished in any desired manner that allows installation of the software on computers (e.g. see server computers 104 and/or end user computers 106 of FIG. 1, for example, etc.). For instance, the software may be downloaded via a network (e.g. see networks 102 of FIG. 1, for example, etc.). Further, the software may be packaged in boxes and distributed via stores, etc.

Again, the help content may include any help content capable of helping a user with any aspect associated with the software. In one embodiment, the first set of help content may include at least one file for being accessed by the user utilizing a table of contents, an index, a search dialog box, etc. Still yet, the software may include any code and/or data capable of being used and/or executed utilizing the computer. In one embodiment, the software may comprise of a thin client application and be web-based. For example, a user interface of the software may be accessed via an Internet browser.

After distribution of the software with the first set of help content, information relating to issues associated with the software is gathered if and when such issues arise. See decision 304 followed by operation 306. In one embodiment, the information may be gathered via the network (e.g. via e-mail, etc.). Further, the information may be gathered manually via a telephone-based help center.

In the context of the present description, the information may include any information relating to issues associated with the software and capable of being used, at least in part, in generating an additional set of help content. Further, the issues associated with the software may include any issues that potentially require such additional set of help content. Just by way of example, such issues may include unanticipated problems, etc. To this end, the information may optionally be stored in a help database, for reasons that will soon be set forth.

Next, in operation 308, an additional set of help content may be generated based on the gathered information. Such additional set of help content may be generated utilizing any desired manual and/or automated process. As an option, the additional set of help content may include additional help topics, additional help formats, a screen cam, etc. For example, such topics may refer to issues that were previously unrealized. Further, the additional help formats may include video, audio, additional printable guides, etc. which facilitate aiding users with specific problems. A screen cam is one such format that may "walk" a user through a problem by displaying a mouse icon, keyboard action, etc. for addressing a specific issue.

In the context of one example, the information may thus be gathered utilizing the aforementioned avenues (e.g. help center, e-mail, etc.). Thereafter, notes regarding the associated issues may be stored in the aforementioned help database in an organized manner. Such help database may even be made available on-line, as an option. Therefore, the notes and other information stored in the help database may be used to manually/automatically generate the additional set of help content.

As an option, the help database may further include various fields describing different issues using standard descriptors (in addition to the notes). To this end, strictly as an option, statistics may be determined based on the information stored in the help database. Thus, the additional set of help content may be generated based on the statistics.

For example, there may be a particular field that describes a type of the corresponding issue. Thus, if a count of such particular field indicates that one specific type of issue is more prevalent than a predetermined threshold (e.g. >X counts), such may prompt the generation of the additional set of help content for addressing such issue. Of course, any type of field (e.g. degree of severity, location, type of customer, etc.) may be utilized in a similar fashion with or without thresholds, etc.

Next, an update schedule associated with the users may be identified utilizing the software. Note operation 310. Such schedule may be user-specified and/or automatically dictated, as desired. For example, for the purposes of conserving bandwidth, server resources, etc., the schedule associated with each user may be automatically determined to minimize the collective impact of the aforementioned updating. On the other hand, the user may desire to manually select an update schedule based on his or her computer use, etc. More information on one illustrative type of update scheduling interface will be set forth in greater detail during reference to FIG. 4.

To this end, the additional set of help content may be automatically distributed to the users based on the update schedule, utilizing the network. See operation 312. Upon receipt of the additional set of help content, a source thereof may optionally be verified in decision 314, in order to ensure that it has not been tampered with or is the product of malicious activity. This may be accomplished by checking a signature that accompanies the additional set of help content, and/or by any other desired technique.

It should be noted that the additional set of help content may be generated (see operation 308, for example) and/or distributed (see operation 312, for example) in a dynamic manner. As mentioned previously, for instance, the additional set of help content may be generated, based on statistics associated with the information. As still another option, characteristics associated with computers of the users may be gathered. The characteristics may include characteristics of at least one of software and hardware of the computers (e.g. type of operating system, processing/memory resources, bandwidth constraints, etc.). To this end, the additional set of help content may be either generated and/or distributed as a function of the characteristics.

For example, if it is determined that a predetermined set of computers merely has a dial-up connection, and some of the additional set of help content relates only to computers with high-bandwidth connections, the additional set of help content may be tailored for such computers to exclude such high-bandwidth-related additional set of help content.

Of course, this example is merely illustrative in nature, and any characteristic of the different computers may be used to tailor the additional set of help content that is generated and the manner in which it is distributed. As yet another example, a language being used with a particular software application may dictate a language associated with the additional set of help content that is generated and/or distributed thereto. Further, the additional set of help content may be limited only to software that is known to be installed on the pertinent computers.

Once the additional set of help content is distributed, such additional set of help content may be integrated with the first set of help content based on the verification, for presentation purposes, as indicated in operation 316. The present integration may include any process that allows presentation of the additional set of help content with the first set of help content.

In one optional embodiment, the integration may provide a seamless integration of the different help content. Just by way of example, the integration may include an update of a table of contents of the first set of help content. For instance, if a pagination of the first set of help content is changed due to content additions, new help content topics that require additional chapters, etc.; such may be reflected in the updated table of contents. As a first option, an entire updated table of contents may be included with the additional set of help content, if required. As a further option, in accordance with another embodiment, instructions may be provided with the additional set of help content for updating the table of contents, without requiring transmission of the entire updated table of contents. It should be noted that a similar update may be provided for an index of the help content, as well as a set of searchable terms that may be used to quickly find desired help content.

In still yet another embodiment, to avoid an abundance of bandwidth usage, the additional set of help content may be a fraction of a size of the first set of help content. For example, the additional set of help content may not necessarily include the entire file (i.e. like that associated with the first set of help content, etc.), but rather only the portions that are changed, additional portions that have been added, identification of any portion to be deleted, etc.

Optionally, the integrated first set of help content and additional set of help content may be presented to the user via a single user interface. More information on one illustrative type of user interface will be set forth in greater detail during reference to FIG. 5.

It should be noted that any of the foregoing operations and/or decision may be accomplished by a server computer (e.g. see server computers 104 of FIG. 1, for example, etc.) and/or end user computers (e.g. see end user computers 106 of FIG. 1, for example, etc.). In one optional embodiment, however, operations/decisions 302-308, and 312 may be carried out by a server computer, while operations/decisions 310, 314, and 316 may be carried out by end user computers.

In the context of the aforementioned optional embodiment, the foregoing operations may be described as follows, when taken from the perspective of a computer with the help content installed thereon. Initially, a first set of help content associated with software is accessed. Next, an additional set of help content is received based on information relating to issues associated with the software. An update schedule associated with the software is identified. To this end, the additional set of help content is received based on the update schedule, utilizing a network. Thereafter, the additional set of help content is integrated with the first set of help content. The integrated first set of help content and additional set of help content are then presented to the user via a single interface.

To this end, the additional set of help content may optionally be distributed to the users prior to a subsequent version of the software releases.

More illustrative information will now be set forth regarding various optional architectures and features with which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
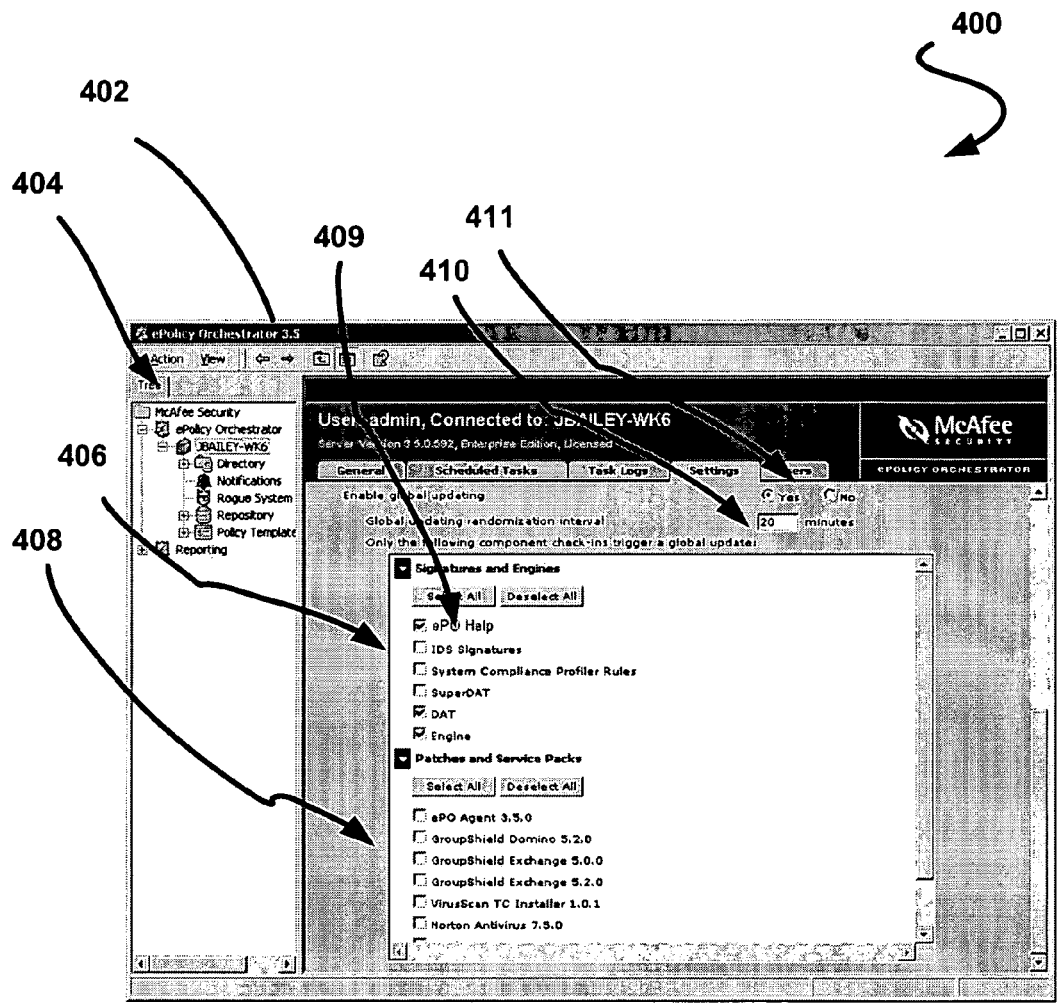
FIG. 4 illustrates an exemplary graphical user interface for creating an update schedule, in accordance with one embodiment.

FIG. 4 illustrates an exemplary graphical user interface 400 for creating an update schedule, in accordance with one embodiment. As an option, the present interface 400 may be implemented in the context of the architecture and environment of FIGS. 1 and/or 2, and even the method 300 of FIG. 3. For example, the interface 400 may be utilized in the context of operation 310 of the method 300 of FIG. 3. Of course, however, the interface 400 may be used in any desired environment.

As shown, the interface 400 includes a window 402, which may be accessed via a tree structure 404 associated with the software. Included on the interface 400 is a first set of selection icons 406 (e.g. check boxes, etc.) associated with signatures and engines, and a second set of selection icons 408 associated with patches and service packs. A first one of the selection icons 406 includes a help content update selection icon 409.

Upon the help content update selection icon 409 being selected, the software of the computer is scheduled to receive additional sets of help content. Such schedule may optionally be user-selected via a global updating randomization interval selection window 410, whereby the software of the user sets the schedule of updating on a periodic interval of a length dictated by the window 410. As a further option, a global update selection icon 411 may further be provided to globally enable/disable updating.

Figure 5:
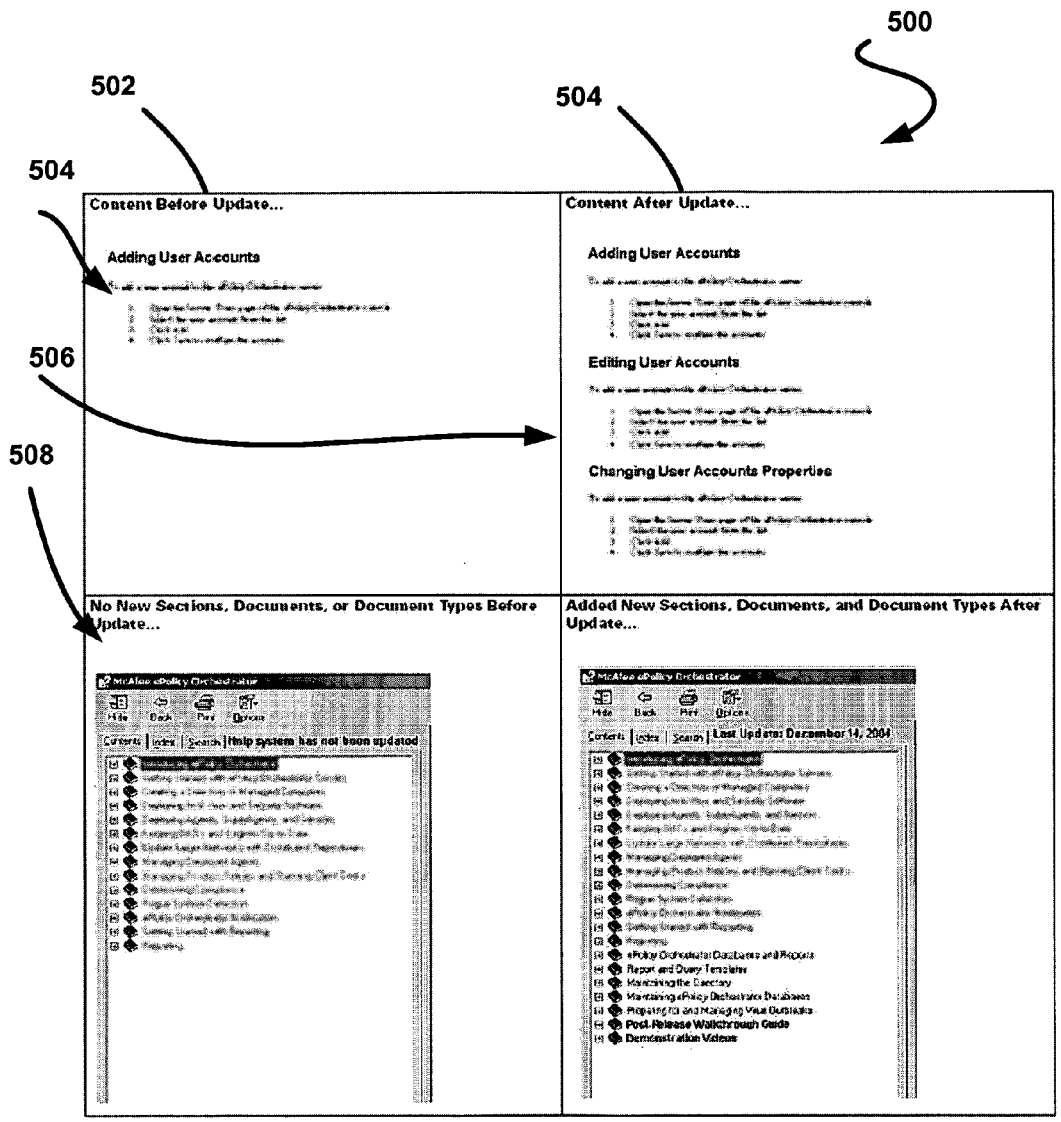
FIG. 5 illustrates an exemplary graphical user interface for integrating the first set of help content with the additional set of help content, in accordance with one embodiment.

FIG. 5 illustrates an exemplary graphical user interface 500 for integrating the first set of help content with the additional set of help content, in accordance with one embodiment. As an option, the present interface 500 may be implemented in the context of the architecture and environment of FIGS. 1 and/or 2, and even the method 300 of FIG. 3. For example, the interface 500 may be utilized in the context of operation 316 of the method 300 of FIG. 3. Of course, however, the interface 400 may be used in any desired environment.

As shown, the interface 500 may include various stages including a first stage 502, where a first set of help content and a table of contents 508 reflect only the first set of help content. After an update of the help content and an additional set of help content 506 is received, a second stage 504 is provided whereby the additional help content 506 is integrated with the first set of help content.

As an option, the aforementioned software may include security software (e.g. a virus scanner, a firewall, a spyware scanner, an intrusion detection system, etc.) Thus, in one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for updating help content, comprising:
    gathering information relating to issues associated with software from a plurality of users, the software including a first set of help content, and the issues being unresolved by the first set of help content;
    after the gathering, manually generating an additional set of help content based on the information, the additional set of help content being non-existent before the information is gathered; and
    distributing the additional set of help content to the users based on an update schedule, utilizing a network;
    wherein the additional set of help content is capable of being integrated with the first set of help content and presented to each user via a single interface, utilizing the software;
    wherein the additional set of help content is integrated with the first set of help content, and the integration includes updating a table of contents of the first set of help content, such that the table of contents reflects the additional set of help content;
    wherein statistics are determined based on the information which is stored in a help database;
    wherein the additional set of help content is generated based on the statistics;
    wherein the update schedule is set on a periodic interval of a length dictated by a global updating randomization interval selection window associated with the software;
    wherein the generation of the additional set of help content is prompted based on a determination that a number of the issues that are associated with a same degree of severity exceeds a predetermined threshold.

2. The method as recited in claim 1, wherein the software is web-based.

3. The method as recited in claim 1, wherein a user interface of the software is accessed via an Internet browser.

4. The method as recited in claim 1, wherein the information is gathered via the network.

5. The method as recited in claim 1, wherein the information is gathered via a telephone-based help center.

6. The method as recited in claim 1, wherein the information is gathered via e-mail.

7. The method as recited in claim 1, wherein characteristics associated with computers of the users are gathered.

8. The method as recited in claim 7, wherein the characteristics include characteristics of at least one of software and hardware of the computers.

9. The method as recited in claim 7, wherein the additional set of help content is at least one of generated and distributed based on the characteristics.

10. The method as recited in claim 1, wherein the issues associated with the software include unanticipated problems.

11. The method as recited in claim 1, and further comprising verifying a source of the additional set of help content.

12. The method as recited in claim 1, wherein the additional set of help content is distributed to the users prior to a subsequent version of the software releases.

13. The method as recited in claim 1, wherein the additional set of help content includes additional help topics.

14. The method as recited in claim 1, wherein the additional set of help content includes additional help formats.

15. The method as recited in claim 1, wherein the additional set of help content includes a screen cam.

16. The method as recited in claim 1, wherein the additional set of help content is a fraction of a size of the first set of help content.

17. The method as recited in claim 1, wherein software includes security software.

18. The method as recited in claim 1, wherein the method counters terrorism.

19. The method as recited in claim 1, wherein the generation of the additional set of help content is prompted based on a determination that a number of the issues that are of a single type exceeds another predetermined threshold.

20. The method as recited in claim 1, wherein the updated table of contents reflects additional chapters associated with new help content topics.

21. The method as recited in claim 1, wherein updating the table of contents includes distributing an entire updated table of contents with the additional set of help content.

22. The method as recited in claim 1, wherein updating the table of contents includes providing instructions for updating the table of contents with the additional set of help content, such that transmission of an entire updated table of contents is prevented.

23. The method as recited in claim 1, and further comprising updating an index of the first set of help content and updating searchable terms capable of being utilized to find at least a portion of the first set of help content.

24. The method as recited in claim 1, wherein the statistics include a count of a particular field in the help database.

25. The method as recited in claim 24, wherein the field includes a degree of severity.

26. The method as recited in claim 24, wherein the field includes a location field.

27. The method as recited in claim 24, wherein the field includes a type of customer.

28. The method as recited in claim 1, wherein the software sets the schedule of updating on the periodic interval of the length dictated by the window.

29. The method as recited in claim 1, wherein a global update selection icon is provided to globally enable/disable the updating.

30. The method as recited in claim 1, wherein the global updating randomization interval selection window is included in a settings tab of an interface and is accessed via a tree structure associated with the software.

31. The method as recited in claim 1, wherein the generation of the additional set of help content addresses the issues that are associated with the same degree of severity.

32. A computer program product embodied on a non-transitory computer readable storage medium which when executed by a computer causes the computer to perform the following steps:
   gathering information relating to issues associated with software from a plurality of users, the software including a first set of help content, and the issues being unresolved by the first set of help content;
   manually generating an additional set of help content based on the information after the gathering, the additional set of help content being non-existent before the information is gathered; and
   distributing the additional set of help content to the users based on an update schedule, utilizing a network;
   wherein the additional set of help content is capable of being integrated with the first set of help content and presented to each user via a single interface, utilizing the software;
   wherein the additional set of help content is integrated with the first set of help content, and the integration includes updating a table of contents of the first set of help content, such that the table of contents reflects the additional set of help content;
   wherein statistics are determined based on the information which is stored in a help database;
   wherein the additional set of help content is generated based on the statistics;
   wherein the update schedule is set on a periodic interval of a length dictated by a global updating randomization interval selection window associated with the software;
   wherein the generation of the additional set of help content is prompted based on a determination that a number of the issues that are associated with a same degree of severity exceeds a predetermined threshold.

33. A system, comprising:
   a server for gathering information relating to issues associated with software from a plurality of users, the software including a first set of help content, and the issues being unresolved by the first set of help content;
   after the gathering, manually generating an additional set of help content based on the information, the additional set of help content being non-existent before the information is gathered; and
   distributing the additional set of help content to the users based on an update schedule, utilizing a network;
   at least one client in communication with the server via the network, the client capable of integrating the first set of help content with the additional set of help content for the presentation thereof via a single interface;
   wherein the additional set of help content is integrated with the first set of help content, and the integration includes updating a table of contents of the first set of help content, such that the table of contents reflects the additional set of help content;
   wherein the system is operable such that statistics are determined based on the information which is stored in a help database;
   wherein the system is operable such that the additional set of help content is generated based on the statistics;
   wherein the system is operable such that the update schedule is set on a periodic interval of a length dictated by a global updating randomization interval selection window associated with the software;
   wherein the system is operable such that the generation of the additional set of help content is prompted based on a determination that a number of the issues that are associated with a same degree of severity exceeds a predetermined threshold.

34. A method for updating help content, comprising:
   accessing a first set of help content associated with software;
   receiving a manually generated additional set of help content based on information relating to issues associated with the software, the issues being unresolved by the first set of help content and the additional set of help content being non-existent before the information relating to the issues is gathered;
   identifying an update schedule associated with the software;
   receiving the additional set of help content based on the update schedule, utilizing a network;
   integrating the additional set of help content with the first set of help content; and
   presenting the integrated first set of help content and additional set of help content to a user via a single interface;
   wherein integrating the additional set of help content with the first set of help content includes updating a table of contents of the first set of help content, such that the table of contents reflects the additional set of help content;
   wherein statistics are determined based on the information which is stored in a help database;
   wherein the additional set of help content is generated based on the statistics;
   wherein the update schedule is set on a periodic interval of a length dictated by a global updating randomization interval selection window associated with the software;
   wherein the generation of the additional set of help content is prompted based on a determination that a number of the issues that are associated with a same degree of severity exceeds a predetermined threshold.

35. A method for updating a local help database, comprising:
- distributing software including a first set of help content to a plurality of users;
- gathering information relating to issues associated with the software, the issues being unresolved by the first set of help content;
- after the gathering, manually generating an additional set of help content based on the information, the additional set of help content being non-existent before the information is gathered;
- identifying an update schedule associated with the users, utilizing the software;
- automatically distributing the additional set of help content to the users based on the update schedule, utilizing a network;
- verifying a source of the additional set of help content;
- integrating the additional set of help content with the first set of help content based on the verification, utilizing the software; and
- presenting the integrated first set of help content and additional set of help content to each user via a single interface;
- wherein integrating the additional set of help content with the first set of help content includes updating a table of contents of the first set of help content, such that the table of contents reflects the additional set of help content;
- wherein statistics are determined based on the information which is stored in a help database;
- wherein the additional set of help content is generated based on the statistics;
- wherein the update schedule is set on a periodic interval of a length dictated by a global updating randomization interval selection window associated with the software;
- wherein the generation of the additional set of help content is prompted based on a determination that a number of the issues that are associated with a same degree of severity exceeds a predetermined threshold.

* * * * *